June 8, 1965   J. S. SWEARINGEN   3,187,515
METHOD AND APPARATUS FOR CONTROL OF TEMPERATURE
IN ABSORPTION REFRIGERATION SYSTEMS
Filed Sept. 4, 1962   3 Sheets-Sheet 1

INVENTOR.
JUDSON S. SWEARINGEN
BY Philip Subrow
ATTORNEY

June 8, 1965   J. S. SWEARINGEN   3,187,515
METHOD AND APPARATUS FOR CONTROL OF TEMPERATURE
IN ABSORPTION REFRIGERATION SYSTEMS
Filed Sept. 4, 1962   3 Sheets-Sheet 2
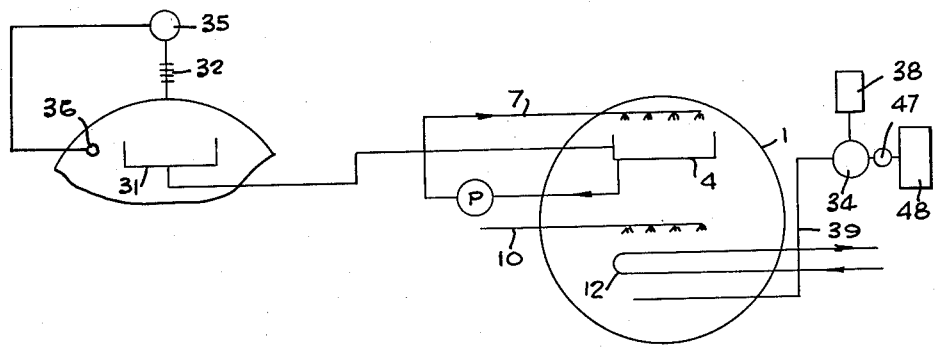
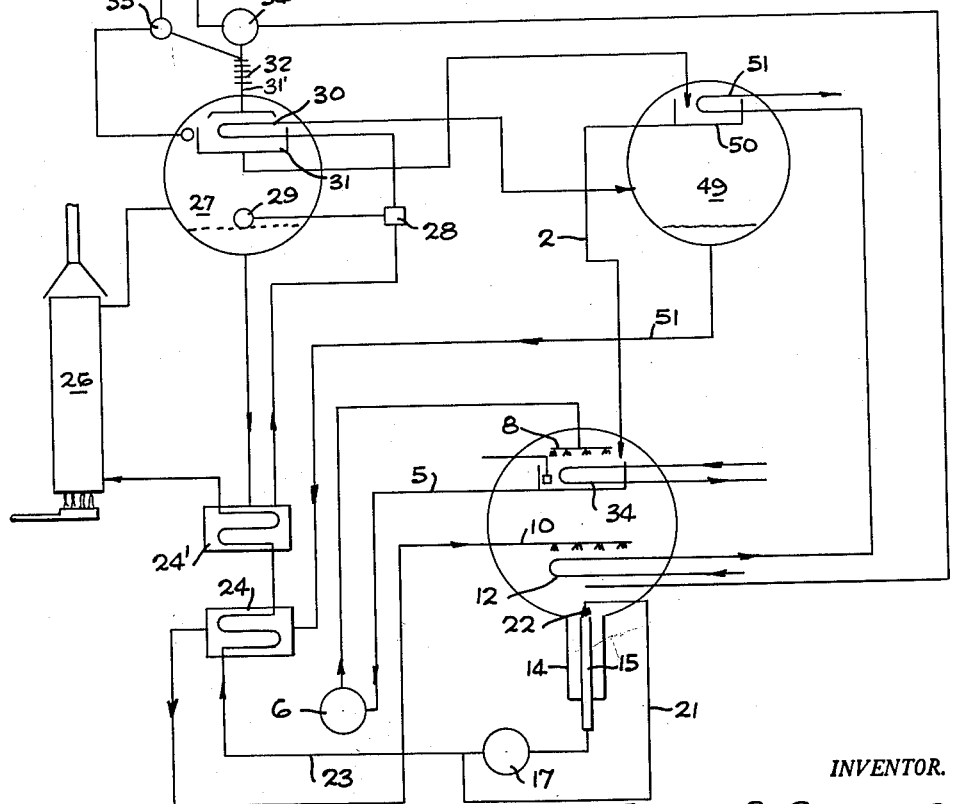
INVENTOR.
JUDSON S. SWEARINGEN
BY
ATTORNEY June 8, 1965 J. S. SWEARINGEN 3,187,515
METHOD AND APPARATUS FOR CONTROL OF TEMPERATURE
IN ABSORPTION REFRIGERATION SYSTEMS
Filed Sept. 4, 1962 3 Sheets-Sheet 3

INVENTOR.
JUDSON S. SWEARINGEN
BY
ATTORNEY

United States Patent Office 3,187,515
Patented June 8, 1965

3,187,515
METHOD AND APPARATUS FOR CONTROL OF TEMPERATURE IN ABSORPTION REFRIGERATION SYSTEMS
Judson S. Swearingen, Los Angeles, Calif., assignor, by mesne assignments, to Electronic Specialty Co., Los Angeles, Calif., a corporation of California
Filed Sept. 4, 1962, Ser. No. 221,194
20 Claims. (Cl. 62—85)

This invention relates to the control of temperature in refrigerant evaporators of absorption refrigeration systems. In such systems, the liquid refrigerant is evaporated at low temperature obtained by maintaining the evaporation zone at a pressure sufficiently low to reduce the vaporizing temperature in the evaporator to the desired low degree. Refrigeration is obtained by circulating a fluid in heat exchange with the evaporating refrigerant.

When the circulating material is water, or the refrigerant is water, it is necessary to limit the temperature in the evaporator to be above the freezing point of water. Otherwise, ice forms to interfere with the efficiency of the cycle and may damage the apparatus. This phenomenon is the more critical in absorption refrigeration systems in which the low pressure in the evaporator is obtained by absorbing the water vapor from the evaporator into a circulating stream of salt solution for example, lithium bromide solution. In such systems, the diluted absorbent salt solution formed in the absorption zone is passed to a regenerator where the salt solution is concentrated in a registration zone, and the concentrated salt solution is cooled and introduced into the absorber, where it passes over coils through which a cooling fluid passes. The vapors from the evaporator pass into contact with the absorbent liquid which wets the coils in the absorption zone and is thereby absorbed.

The temperature in the evaporator depends on the pressure established in the vapor space of the evaporator. In absorption refrigeration systems this is controlled by the pressure in the vapor space of the absorber which is in vapor communication with the vapor space in the evaporator. The pressure in the vapor space of the absorber is established by the vapor pressure of the absorbent liquid in the absorber. Where absorbent liquid is a salt solution, this depends on the concentration of the salt solution and its temperature. If the vapor pressure of the absorbent liquid becomes too low, either because the concentration of the absorbent liquid is too high in salt, or its temperature is too low, the pressure in the absorber may reach that of melting ice and freezing up of the evaporator occurs.

The phenomenon may result from a reduction in the heat load in the evaporator section or a reduction of cooling water temperature. If the temperature of the circulating fluid to be refrigerated is reduced, or the volume rate of circulation of the fluid to be refrigerated is decreased, a reduction in a rate of generation of vapor in the evaporator results and a reduction in the mass transfer rate of vapor to the absorbent liquid results. This results in the reduction of the vapor pressure of the absorbent liquid with a consequent drop in the temperature of the liquid in the evaporator. The most likely cause for the reduction temperature of the evaporator may be the excessively low temperatures of the fluid passing through the cooling coils of the absorber over which the absorbent liquid passes, or it may be the increased rate of circulation of the cooling fluid through the coils of the absorber. By reducing the temperature of the absorbent liquid, its vapor pressure is reduced and this reduces the temperature of the evaporating liquid refrigerant in the evaporation zone. Thus, by either of these mechanisms, or by both, acting together, the temperature may fall sufficiently low to cause freezing in the evaporator.

In order to avoid these deleterious effects, I modulate the pressure in the evaporator to maintain its pressure above the vapor pressure of freezing water, preferably, at such pressure that the water without freezing will be at the desired temperature for refrigeration. The modulation of the pressure is made responsive to the temperature of the refrigerant in the evaporator in such manner that as the temperature in the evaporator falls, to or below a predetermined lower limit of temperature, or equivalent vapor pressure, a gas may be admitted into the absorber.

I have found that the introduced gas modifies the conditions in the absorber so that the pressure in the evaporator rises and thereby the temperature of the evaporating liquid rises. The introduction of gases is regulated to maintain a temperature of the evaporator of the desired level. The effect of the gas appears to modify the rate of absorption vapor into the liquid absorbent. The pressure rise may thus occur because the continued generation vapor in the evaporator and the reduced rate of absorption of the vapor by the absorbing liquid.

While I do not wish to be bound by any theory of how my invention operates, I note that the introduction of the fixed gas effects the thermal and pressure conditions in the absorber resulting in a rise in the temperature of the diluted absorption liquid and in a rise of pressure and temperature in the evaporator.

In the preferred embodiment of my invention, I flow the concentrated absorber liquid over cooling coils in film form and pass the introduced gas so as to sweep over the films of liquid in contact with the films of absorbent liquid on the cooling coils of the absorber. The gas modifies the characteristics of the film to modulate the pressure in the absorption space.

Whatever be the mechanism to explain my observation, I find that by employing gas introduction, I may control the pressure in the evaporator space so as to modulate the temperature of the evaporator liquid to the desired level.

When the system is shut down and is started again, the absorption liquid may be at a relatively high salt concentration and an initial circulation of the absorption liquid in the absorption section may be in sufficiently high concentration to cause an excessive reduction in temperature in the evaporator.

The presence of fixed gas in the absorber resulting from the use of my invention, when the system is shut down, will inhibit an excessive reduction of pressure in the evaporator section and the excessive reduction of the temperature in the evaporator when the system is started again.

I have found that the volume of fixed gas necessary for introduction to control the temperature over a substantial range, for example, 10° F. is sufficiently small that I may employ the gas generated in the system by the limited corrosion by salt solution on the metal or by leakage of air into the system for the purposes of my invention. I may alternatively use gas from an external source for example, hydrogen such as is generated in the system or nitrogen or helium or some other non-corrosive gas. Such gas is herein referred to as fixed gas or uncondensable gas to distinguish it from condensable refrigerants such as, water or other liquid refrigerant employed in absorption refrigeration systems.

As will appear from the foregoing and from the further description of my invention, I have devised a method and apparatus which will act to regulate the pressure in the evaporator and absorber of an absorption refrigeration system, to maintain the temperature in the evaporator absorber at the desired level, preferably above the freezing point of the refrigerant, for example, the freezing point of water.

It is another object of my invention to modulate the pressure and temperature in the evaporator responsive to the refrigeration load and to maintain the pressure and temperature in the evaporator absorber above freezing point of the refrigerant, for example, above the temperature of melting ice.

It is a further object of my invention to maintain sufficient gas in the evaporator and absorber during shutdown period such that when the refrigeration system is started up, the pressures in the absorber-evaporator will be sufficiently low to permit refrigeration, but be above the freezing point of the refrigerant.

These, and other objects of my invention will be further described, or reference to the drawing of which FIGURE 1 is a schematic illustration of a single effect absorption refrigeration system to which my invention may be applied.

FIGURE 2 shows the application of my system to a multiple effect absorption refrigeration system.

FIGURE 3 shows a further modification of my invention.

While this invention is applicable to all forms of absorption refrigeration system employing single effect and multiple effect regeneration systems, and to all forms of refrigerant liquid in which the liquid is vaporizable at the pressure established by absorption of the generated vapors, it finds particularly useful application in systems in which the refrigerant is water, and the refrigeration occurs by the evaporation of the water at a low pressure. This low pressure is obtained by absorbing water vapor in an absorbing liquid which is preferably a salt solution, for example, lithium bromide or chloride. The salt solution is diluted by the absorbed water vapor to produce a salt solution of such concentration as is required to obtain the vapor pressure necessary to establish the desired vaporizing temperature in the evaporator. The evaporation of the water at the low pressures produces cold water which is used to cool the fluid to be refrigerated. The diluted salt solution is then heated to vaporize the absorbed water. The concentrated salt solution is cooled and recirculated to the absorber.

In like manner, I may employ, instead of an absorption system in which the absorbent liquid is evaporated in a single stage, a system in which the absorbent liquid is evaporated in a multiple effect evaporation system. Such systems are described in my copending application Serial No. 159,531 filed December 15, 1961 to above and in an article entitled "An Improved Absorption Refrigeration Cycle," by Whitlow and Swearingen in the October 30, 1958 issue of Gas Age, page 19.

In the following description I will illustrate my invention by salt solution system. But as will be apparent to those skilled in this art, the invention is applicable to other systems employing refrigerant liquid other than water, and absorbent liquids other than salt solution.

Figure 1:
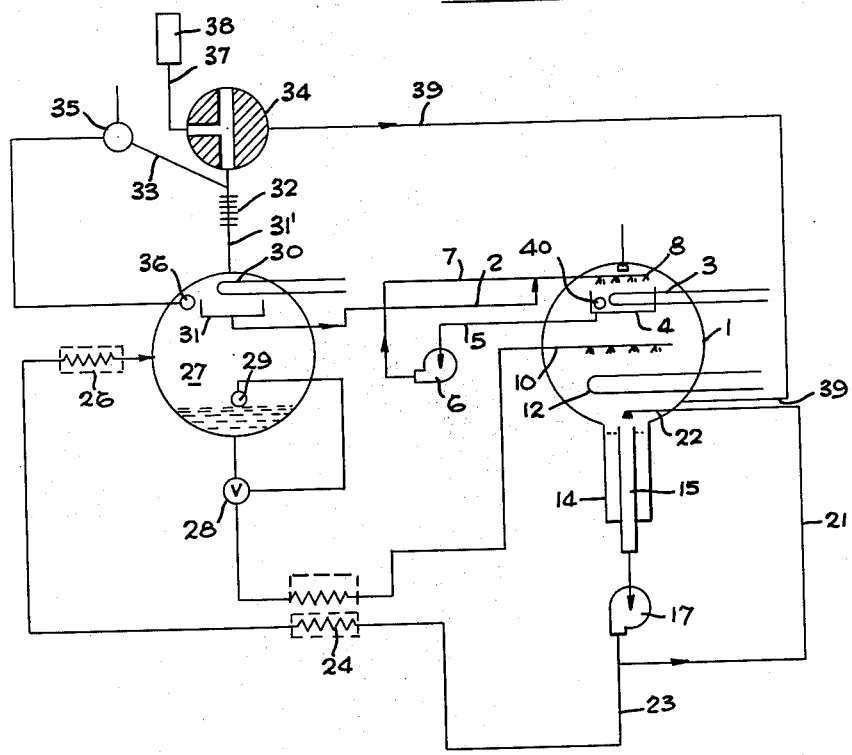

In FIGURE 1, the system is composed of the refrigerant evaporator positioned in shell 1 and containing both the evaporator and the absorber. Water to be evaporated passes through line 2, the source of which will be described below and enters between the tubes of evaporator 3. Air or water to be refrigerated passes (See FIGS. 2, 4 and 5) through the coils 3 in heat exchange with the water in 8. This refrigerant water is collected in tray 4 and circulated through pump 6 to return through line 7 over surfaces 9 and spread as a film over the tubes of the bundle 3. It is evaporated in heat exchange with the fluid in 3. Uncondensed vapor together with uncondensable fixed gases passes over the tube bundles (FIG. 4) where it contacts concentrated absorbent salt solution flowing through holes in 10' over the distributing surfaces 11 and 11' and over the tubes of the tube bundles 12 and 12' in heat exchange with a cooling fluid shown schematically at 12 in FIGURE 2. The salt solution passes over cooling tubes of the tube bundles in heat exchange and flows into a sump 14.

Figure 4:
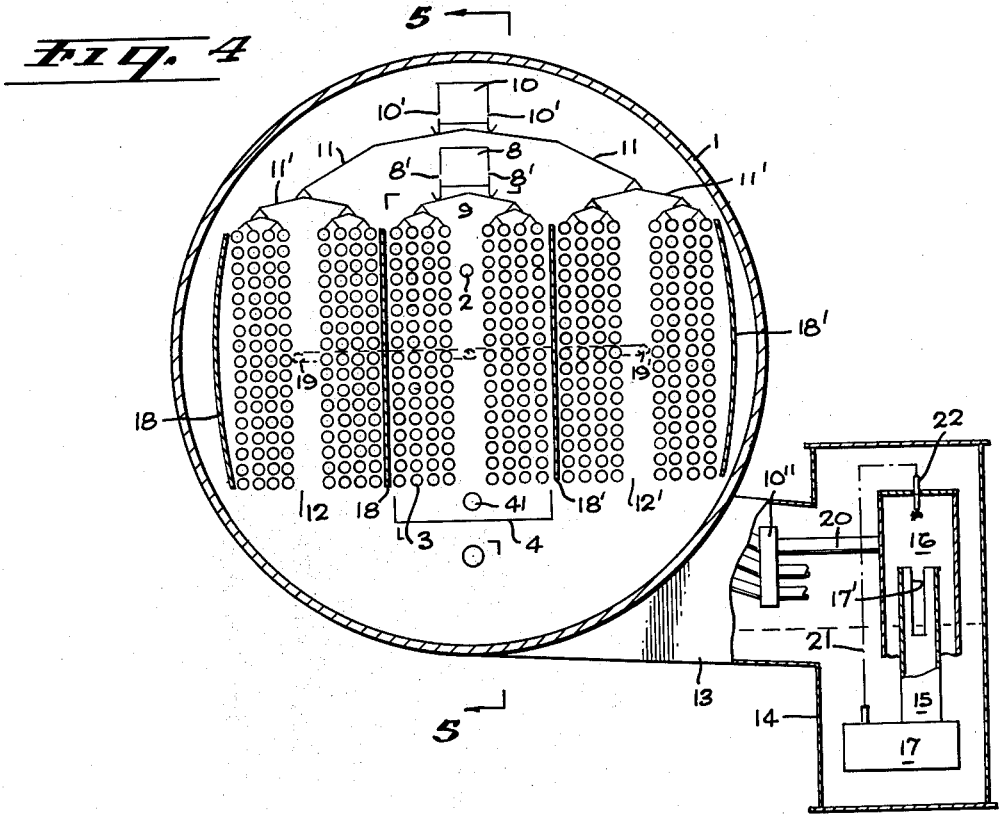
FIGURE 4 shows an arrangement of absorption and evaporator tubes in absorption refrigeration systems suitable for use with my invention.
Figure 5:
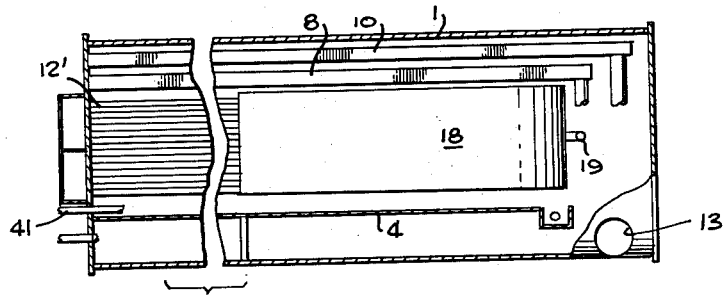
FIGURE 5 is a section taken on line 5—5 of FIGURE 4.

A preferred embodiment of the structure of the absorber-evaporator refrigeration system is illustrated schematically in FIGURES 4 and 5 and more specifically described in my copending application Serial No. 221,180, filed September 4, 1962.

For purposes of this invention, however, the particular construction of the absorber evaporator is not important except for the features to be described below. The diluted salt solution passing over the coils 12 and 12' and collected in the bottom of the shell 1 and passes through a tunnel 13 into the sump 14 which is positioned one end of the shell 1 as is illustrated in FIGURE 4 and schematically in FIGURES 1 and 2.

Referring to the cycle shown in FIGURE 1, the diluted salt solution in the sump 14 enters tube 15 under the bell 16 projecting into the solution in sump 14 and is circulated through the tube 15 into which it enters through a slot 17', and by pump 17 as will be described below.

The tube banks 12 and 12' are enclosed by shields 18 and 18' which communicate through outlets 19, 19' and pipe 20 shown schematically in FIGURE 4 with the interior of the bell 16. Part of the absorbent liquid from pump 17 is circulated by pipe 21 into nozzle 22 where the stream of liquid entraps gas in the bell 16 and the mixed gas and liquid is introduced into the tube 15 and pump 17. This method of removing gas is described in my copending application 157,170 filed December 5, 1961 which is herewith incorporated by this reference. A heterogeneous mixture of vapor gases and liquid is formed. This unit thus acts as a gas pump to withdraw uncondensed vapors and gases from the shell 1. The outlet 19 and 19' providing the lowest pressure points in the shell 1.

The diluted salt solution from pump 17 also passes through the line 23 through the heat exchange 24 and heater 26 and into the separator 27 which is maintained somewhat above ambient pressure, that is, the pressure existing externally of the system.

The concentrated salt solution is collected in 27 and passes through valve 28 controlled by the float 29 and through the heat exchanger 24 into the box conduit 10 of the absorber. The separated vapors in 27 are condensed by cooling coil 30 and collected in condensate receiver 31 which is at the pressure of the separator. The condensate passes through line 2 into the box conduit 8 as described above. Suitable throttling means not shown is employed in line 2 to maintain the required pressure differential between the zone 31 and the shell 1. Conventional means such as throttling orifices may be employed. Preferably I may use the liquid seal means described in my copending application Serial No. 159,708 filed December 15, 1961 now Patent No. 3,146,604, which is hereby incorporated by this reference.

Uncondensed vapor gas from the condenser coils 30 passes through the vent line where it is further cooled by an atmospheric cooling by an air condenser for example, a finned air condenser 32. It is then vented or circulated as will be described below.

A lead off line 33 is tapped into line 31 downstream of the condenser 32 and ahead of the valve 34 to be described later. Condensate formed in line 31' drains back into 31. Line 33 is controlled by valve 35 which is operated by a motor for example, a solenoid controlled by the pressure sensor 36 in the chamber 27. This pressure sensor closes a circuit on a motor i.e. the solenoid to open the valve 35 to vent gas when the pressure in the separator and condenser is above ambient pressure at the desired level. The air condenser 32 connected to line 37 and a closed gas receiver 38 by means of a three way valve 34 which is connected to line 39 connected to the absorber shell 1 as will be described below. When the temperature in the evaporator tray 4 is reported by the temperature sensor 40 is at the desired level, above freezing, valve 34 is oriented so that the air condenser 32 is connected to the closed vessel 38 and the line 39 is shut off from 38 and 32 as is illustrated in the FIGURE 1. Uncondensed gas and any vapor uncondensed by the air condenser 32 enters a reservoir 38 until the pressure in 38 is balanced by the pressure in 27 and any vapor condensed in line 37 and in the reservoir 38 returns to the condenser 31. If the temperature as reported by the sensor 40 falls to a predetermined lower level, valve 34 is rotated to connect 38 with line 39 and line 31 is closed off from the reservoir 38 and line 39. The effect of this introduction of gas will be described below.

Figure 6:
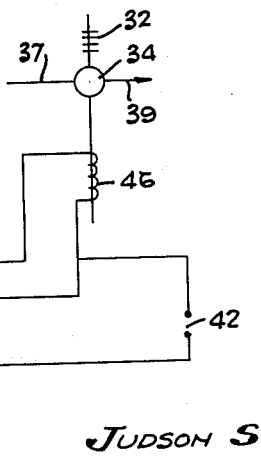
FIGURE 6 illustrates a control system for the operation of the valve employed in the previous figures.

A control circuit for valve 34 is shown in FIGURE 6. If the temperature of the water in the evaporator tray 4 falls too low, herein referred to as the control point or control temperature, the temperature sensor 40 closes the switch 41. This closes the circuit from the power source 42 through electrical connection 43 and 44 and switch 45 and energizes the solenoid motor 46. The solenoid rotates the valve 34 to connect 37 with 39.

The vessel 38 which is at a relatively high pressure compared to the pressure in 1, vents gas into the shell. The gas is introduced so as to sweep over the cooling coils 12 and 12' in the absorption space in the absorber. This is conveniently done as is illustrated in FIGURE 5 by positioning the gas introduction underneath the evaporator tray 4 so it will sweep in both directions and upward over the cooling coils of the absorber section.

The shields 18 and 18' which extends around one end of the tube bundles 12 and 12' and part way along their length forms a channel to direct the flow of vapor to pass over the tube and the unabsorbed fixed gas are drawn off at 19 and 19' by conduit 20.

Simultaneously, with the closing of the circuit at 41, circuit is closed on the time controlled motor unit 46' which may be solenoid or other motor, actuating timing cams which after a lapse of a predetermined period of time, moves the contact arm 45 away from the contact 45' opening the circuit on the solenoid 46 and thus the valve 34 is rotated to close off the connection between 38 and 39 to open the connection between 38 and 31 and close the connection between 31 and 39. After the passage of a predetermined interval of time, sufficient to permit the introduced gas to affect the conditions in the absorber, and time for the temperature sensor 40 to respond, the switch on 45 is returned to close the contact on 45'. Such time control switches are well known and commercially available and need no further description.

If, when the arm 45 contacts the contact 45', switch 41 is still closed as a result of the undesired low temperature of the liquid in 4, the valve 34 is again rotated to connect the reservoir 38 with line 39. Thus, by repeated cycling of valve 34, slugs of gas is introduced into the absorber 1 and the temperature of the absorber is modulated in steps to approach the temperature level desired without excessive hunting.

While I prefer to employ fixed gas present in the system and circulate the same as described above, I may, however, employ an independent source of gas at a relatively high pressure as is illustrated in FIGURE 3. In such case, I omit the valve 34 and the chamber 38 from line 31 and connect the line 39 through the valve 34 controlled as is the valve 34 as shown in FIGURE 1. If necessary, I add a throttling valve 47 between the valve 34 and the high pressure gas reservoir 48, which may contain nitrogen or helium or hydrogen. The action of this gas is similar to the action described above for the separated gases. System operates otherwise in substantially the manner described above. The systems described in connection with the single effect absorption refrigeration system of FIGURES 1 and 3 may also be applied to the multiple effect systems such as illustrated in FIGURE 2 and referred to above in which parts similar to like parts in FIG. 1 bear the same numbers as in FIG. 1. The significant difference between the two systems resides in that portion of the circuit in which the diluted absorption liquid from the absorber is regenerated. As shown in FIGURE 2, this is accomplished by passing the circulating diluted absorption liquid from the absorber shell 1 through heat exchanger 24 and through the heat exchange 24' to the heater 26. The partially concentrated absorption liquid in the 27 circulates under the control of the float controlled valve 28 through the heat exchanger 24' and is flashed through the condenser coils 30 in heat exchange with vapor in condenser 31. It passes into a second effect separator 49 vapor separated in 49 passes to condenser and is condensed by cooling fluid in coils 51. Condensate is collected in the condenser tray 50 and introduced through line 2 into box conduit as in FIGURES 4 and 5. The unvaporized concentrated salt solution passes through line 51 and through the heat exchange 24 into the absorber via 10. In other respects the system described herein is the same as the single effect system and employs the gas and vapor recirculation features described in connection with the previous figures, similar parts bearing similar numbers.

The system including the temperature sensor has a finite response time. That is, there is a substantial interval of time before a condition established in the absorber section which results in a downward drift in temperature at the evaporator coil, results in a sufficient change in temperature at the temperature sensor to be sensed by the sensor. There is in addition, a finite interval of time before the sensor is affected by a reduction in temperature in the water region in which the sensor is immersed. By this time, however, the temperature at the evaporator coils has fallen to a lower temperature than the temperature in the water at the sensor. There is an additional interval of time between the introduction of gas into the absorber section and the time that its effect is transmitted to affect the temperature conditions at the evaporator coils. These time intervals thus constitute the response time of the system.

Thus, in order that the gas introduction shall keep the temperature at the evaporator coils a safe distance from freezing, the temperature at the sensor must be kept at a higher temperature level, therein called the control temperature or control point so that giving effect to the response time of the system the gas introduction can effectively prevent the unwanted temperature excursion at the evaporator coils.

In the method and apparatus of this invention, the gas is introduced as a slug and has an immediate effect on the conditions in the absorber, the switch 45–45' is then opened and time sufficient to allow the effect of the added gas to be sensed by the temperature sensor is provided. Then the switch 45–45' is again closed.

The added gas immediately arrests the downward trend in the temperature and reverses the trend to cause an increase in temperature. If, when the switch 45–45' again closes, switch 41 is still closed and another slug of gas is added. Since, not only is the temperature in 4 higher, but the rate of downward drift is less, the modulation by the next slug operating as described above will move the temperature closer to the control point and by repeated action the temperature will be moved in one or more finite and discrete steps towards the control point. In this manner, hunting by surging temperatures in wide swings around the control point is avoided.

While I may employ a continuous rather than a slug method of gas introduction, I prefer the method of introduction by slugs. This slug method is preferred over a continuous bleeding of gas into the absorber which is initiated by a sensing unit when the temperature in the tray 4 reaches a preset control point somewhat higher than the danger point i.e. freezing temperatures.

For such continuous systems to work at all, the rate of gas introduction must be sufficiently slow so that the effect of gas introduction does not cause a rise in temperature in the evaporator section of such rate as to exceed the response time is a substantial time interval, this requires that the control temperature be made sufficiently high above the danger point in order to provide sufficient time to provide a sufficient amount of gas to enter to produce the desired effect. Additionally, due to the response time of the system, gas introduction continues after the temperature has reached a safe level and thus the temperature at the evaporator coils may rise to an undesirable high level. Thus, larger temperature swings about the control point may be obtained. Thus, control by continuous bleeding of gas, as distinguished from introduction of gas as a slug, is much more difficult.

Thus, in my system, the control point may be much closer to the danger point than in continuous gas introduction. Furthermore, the problem of controlling the flow of fixed gas through orifices to produce the low rates of gas flow volume is an additional disadvantage in such continuous gas introduction.

The continuous removal of gas from the absorber co-operates with the gas introduction to maintain the desired balance of gases in the absorber to obtain the desired level of pressure in the absorber.

Since gas generation by limited corrosion or by air leaks may be present, it would raise the pressure and temperature in the absorber to an undesirable degree. Furthermore, the continual withdrawal of gas moderates the effect of the introduced gas to dampen any excessive temperature swings above the control point resulting from the non-ideality of the system due to the time lag of the sensing system which I have referred to as the response time.

The gas withdrawal prevents the excessive accumulation of gas in the absorber resulting from repeated slugs introduced as a result of repeated temperature surges in the evaporator resulting from repeated but spaced occurrences of drifts in temperature in the tray 4 to and below the control point.

While I have described particular embodiments of my invention for purposes of illustration, it should be understood that various modifications and adaptations thereof may be made within the spirit of the invention as set forth in the appended claims.

I claim:

1. A process of refrigeration which comprises evaporating water in an evaporation zone, passing a fluid to be refrigerated in heat exchange with the water being evaporated, passing the generated vapor into an absorption zone in contact with a salt solution thereby absorbing said vapor in such salt solution and cooling said salt solution, introducing a stream of fixed gases into said absorption zone, in contact with said salt solution in said absorption zone and thereby increasing the temperature in said evaporation zone.

2. In a process of claim 1 in which said gas introduction is periodically interrupted.

3. In the process of claim 1 which said introduction of gas is responsive to the temperature of the water in said evaporation zone and said gas introduction occurs when the temperature in said evaporation zone is below a predetermined minimum.

4. In the process of claim 2 in which said introduction of gas is responsive to the temperature of the water in said evaporation zone and said gas introduction occurs when the temperature in said evaporation zone is below a predetermined minimum.

5. In the process of refrigeration which comprises evaporating water in an evaporation zone, passing a fluid to be refrigerated in heat exchange with water being evaporated, passing the vapor into an absorption zone maintained at substantially the pressure of the evaporation zone in contact with a salt solution thereby absorbing said vapor in said salt solution, cooling said salt solution, removing said salt solution diluted with said absorbed water vapor and mixed with uncondensed fixed gases from said absorption zone, forming vapors and gases from said removed absorption liquid mixture and separating the generated vapors and the gases from the unvaporized salt solution, condensing said vapors, separating liquid condensate from the uncondensed gases, circulating said condensate to the evaporation zone and passing the separated fixed gases into the absorption zone into contact with the absorption liquid and vapor passing from the evaporator to the absorption zone.

6. In the process of claim 5 in which said gas introduction into the absorption zone is periodically interrupted.

7. In the process of claim 5 in which said introduction of gas into the absorption zone is responsive to the temperature of the water in said evaporation zone, and said gas introduction occurs when the temperature in said evaporation zone is below a predetermined minimum.

8. In the process of claim 6 in which said introduction of gas is responsive to the temperature of the water in said evaporation zone, and said gas introduction occurs with the temperature in said evaporation zone is below a predetermined minimum.

9. In the process of claim 5 in which said absorption liquid is continually withdrawn from said absorption zone and said gas is separately and continuously withdrawn, mixing said withdrawn gas and absorption liquid and heating said mixture in a vapor generation zone.

10. In the process of claim 9 in which the introduction of gas into the absorption zone is periodically interrupted.

11. In the process of claim 9 in which said introduction of gas into the absorption zone is responsive to the temperature of the water in said evaporation zone and said gas introduction occurs when the temperature in said evaporation zone is below a predetermined minimum.

12. In the process of claim 11 in which the introduction of gas into the absorption zone is periodically interrupted.

13. In an absorption refrigeration system, a refrigerant evaporator and absorber in vapor communication with said evaporator, cooling coils in said absorber, means to pass an absorption liquid over said coils in contact with vapor in said absorber, a source of fixed gas at a pressure substantially higher than the pressure in said absorber, a passageway connecting said source and said absorber and means responsive to a condition related to the temperature of the liquid in said evaporator for controlling the introduction of said fixed gas from said higher pressure source into said absorber through said passageway.

14. In the system of claim 13 said valve means for introducing said fixed gas, including means for opening communication between said source and said absorber through said passageway and means for periodically interrupting the introduction of said fixed gas into said absorber.

15. In the system of claim 13 temperature sensing means for controlling the introduction of gas from said source comprising a valve in said passageway, a condition sensor responsive to a condition related to the temperature of the liquid in said evaporation, means including said sensor for operating said valve when the temperature of said liquid in the evaporator is below a predetermined limit to open communication between said source and said absorber, said valve closing communication through said passageway when the temperature is above a predetermined limit.

16. In the system of claim 15, means also for periodical operating said valve to close and open when the temperature of the liquid in said evaporator is below the predetermined temperature limit.

17. In an absorption refrigeration system, a refrigerant evaporator, means to pass a fluid to be cooled in heat exchange with the liquid in said evaporator, an absorber, vapor communication between said absorber and said evaporator, a cooling coil in said absorber, means to circulate absorption liquid over said coils and contact with vapor passing from said evaporator, means to withdraw absorption liquid from said absorber, means to heat said withdrawn liquid to generate vapors, a separator, for separating vapors and fixed gases for unvaporized heated absorption liquid, means to condense generated vapors and means to separate the uncondensed vapors and gases from said condensed liquid, means to introduce the last named condensate into the evaporator and means responsive to a condition related to the temperature of the liquid in said evaporator to introduce into said absorber an uncondensed fixed gas resulting from said last named condensation.

18. In the system of claim 17 said last name means including a pipe connected to said condenser and a closed reservoir connected to said last name pipe, a second pipe connecting said reservoir to said absorber, means to open communication between said first name pipe and said reservoir and to close said communication between said first name pipe and said reservoir and to close said communication between said reservoir and said second pipe, sensing means responsive to the temperature in the evaporator cooperating with said last name means to open communication between said reservoir and said condenser.

19. In the system of claim 18 means to periodically open and close communication between said reservoir and said absorber when said temperature when said evaporator is above a predetermined limit.

20. In the system of claim 18 said means to open and close communication between said reservoir and said condenser and between said reservoir and said absorber, including a three way valve and motor means to operate said valve responsive to the temperature in said evaporator, said motor means also including a time controlled means to periodically open and close communication between said reservoir and said absorber and to close communication between said reservoir and said condenser when the temperature in said evaporator is below a predetermined limit.

References Cited by the Examiner
UNITED STATES PATENTS

| | | | |
|---|---|---|---|
| 2,167,697 | 8/39 | Thomas | 62—110 |
| 2,207,838 | 7/40 | Thomas | 62—492 |
| 2,959,931 | 11/60 | Leonard | 62—141 X |
| 2,986,894 | 6/61 | Endress et al. | 62—85 |
| 3,013,404 | 12/61 | Endress et al. | 62—475 X |

ROBERT A. O'LEARY, *Primary Examiner.*